US009829612B1

(12) United States Patent
Koudsi et al.

(10) Patent No.: US 9,829,612 B1
(45) Date of Patent: Nov. 28, 2017

(54) DIFFRACTION GRATING BASED 3-D DISPLAY

(71) Applicant: Optecks, LLC, Bixby, OK (US)

(72) Inventors: Badia Koudsi, Bixby, OK (US); Hakki H. Refai, Bixby, OK (US)

(73) Assignee: Optecks, LLC, Bixby, OK (US)

( * ) Notice: Subject to any disclaimer, the term of this patent is extended or adjusted under 35 U.S.C. 154(b) by 182 days.

(21) Appl. No.: 14/686,521

(22) Filed: Apr. 14, 2015

Related U.S. Application Data

(60) Provisional application No. 62/057,027, filed on Sep. 29, 2014, provisional application No. 61/979,390, filed on Apr. 14, 2014.

(51) Int. Cl.
| | | |
|---|---|---|
| *G02B 27/22* | (2006.01) | |
| *G02B 5/18* | (2006.01) | |
| *G02B 27/10* | (2006.01) | |
| *G02B 26/08* | (2006.01) | |
| *H04N 13/04* | (2006.01) | |
| *H04N 13/02* | (2006.01) | |

(52) U.S. Cl.
CPC ....... *G02B 5/1842* (2013.01); *G02B 26/0808* (2013.01); *G02B 27/1086* (2013.01); *G02B 27/2242* (2013.01); *G02B 27/2292* (2013.01); *H04N 13/0253* (2013.01); *H04N 13/0495* (2013.01)

(58) Field of Classification Search
CPC .. G02B 27/106; G02B 27/1086; G02B 27/22; G02B 27/2242; G02B 27/2271; G02B 27/2278; G02B 27/2285; G02B 27/2292; G02B 5/1842; G02B 5/1857; G03B 35/18; G03B 35/20; H04N 13/0253; H04N 13/04; H04N 13/0427; H04N 13/0488; H04N 13/049; H04N 13/0493; H04N 13/0495; H04N 13/0497; G03H 2001/2213; G03H 2001/2292; G03H 1/22; G03H 1/2286
See application file for complete search history.

(56) References Cited

U.S. PATENT DOCUMENTS

| | | | | |
|---|---|---|---|---|
| 5,214,419 A | * | 5/1993 | DeMond | G02B 26/0841 345/32 |
| 5,943,160 A | * | 8/1999 | Downing | G02B 27/2271 348/E13.022 |
| 6,281,994 B1 | * | 8/2001 | Horikoshi | G03H 1/0248 359/12 |

(Continued)

*Primary Examiner* — Bumsuk Won
*Assistant Examiner* — Ephrem Mebrahtu
(74) *Attorney, Agent, or Firm* — Dunlap Codding, P.C.

(57) ABSTRACT

A three-dimensional display system and methods for forming 3D images are disclosed. In one version, a diffusion screen is formed at a predetermined $location_1$ of a set of predetermined locations 1-n within an image chamber. The diffusion screen is illuminated with visible light indicative of a cross-sectional $image_1$ of a set of a plurality of cross-sectional images 1-N of a three-dimensional image at the predetermined $location_1$ within the image chamber. The diffusion screen is erased and the method is repeated for cross-sectional images 2-N and predetermined locations 2-n of the three-dimensional image at a scan rate sufficient to produce a representation of the three-dimensional image in the image chamber.

15 Claims, 6 Drawing Sheets

(56) References Cited

U.S. PATENT DOCUMENTS

| | | | | |
|---|---|---|---|---|
| 6,525,699 B1 * | 2/2003 | Suyama | ............ | G02B 27/2278 345/419 |
| 2005/0286101 A1 * | 12/2005 | Garner | .................... | G03H 1/02 359/9 |
| 2013/0271800 A1 * | 10/2013 | Kanugo | ............... | G03H 1/2294 359/9 |
| 2014/0015867 A1 * | 1/2014 | Xin | ................... | G02B 27/2271 345/690 |

* cited by examiner

DIFFRACTION GRATING BASED 3-D DISPLAY

CROSS-REFERENCE/INCORPORATION BY REFERENCE

The present patent application claims priority to the provisional patent application identified by U.S. Ser. No. 61/979,390 and filed on Apr. 14, 2014, and also claims priority to the provisional patent application identified by U.S. Ser. No. 62/057,027 and filed on Sep. 29, 2014, the entire content of both provisional patent applications are hereby incorporated herein by reference.

BACKGROUND

The ultimate goal of three-dimensional display technology is to show a dynamic three-dimensional image. Despite the fact that the human visual system is uniquely constructed to function in a three-dimensional (3-D) world, the majority of current commercially available display technologies are based on flat, two-dimensional (2-D) methods of displaying visual information. In an attempt to display 3-D information on these displays, many sophisticated and powerful techniques, such as perspective, shadowing, and texturing have been developed to trick the eye into seeing a 3-D image. These techniques, however, are ultimately limited in effectiveness because they do not provide depth cues in a manner that is natural to visual processing. Therefore, displays capable of producing a true 3-D image are required to overcome the limitations of 2-D displays.

Volumetric displays form voxels—pixels in a 3-D grid—to represent objects in space. Because each voxel emits or scatters light at a specific point in space, volumetric displays represent objects having a more natural depth perception. Conventional 3-D volumetric displays utilize an upconversion process to produce an image within a volumetric display. One of the fundamental requirements for an upconversion volumetric 3-D display system is to have the entire display volume filled with voxels that can be selectively excited at any desired location. Methods of creating the required voxels include, solid-state (rare-earth particles doped into a glass host), gas medium (atomic vapor enclosed in a vaccum container), and crystal cube static screen (tiny dots engraved within a glass cube using a process known as Laser Subsurface Engraving), among others. To represent an object within the volume, two independently controlled laser beams activate a voxel only when they intersect in a process known as two-photon upconversion. Briefly, this process uses the energy of two infrared (IR) lasers to transform a material from a first level into a first excited level and then to a second excited level, from which it can make a visible fluorescence transition back to the first level. For this process to be useful as a display medium, each voxel must exhibit laser absorption from two different wavelengths, so that it is turned on only at the intersection of two independently scanned laser sources. Either laser by itself will not cause visible fluorescence. However, where both lasers are incident on the same voxel, two-step excitation results in fluorescence at the intersecting point. Scanning the intersection point fast enough, a flicker free 3-D image can be drawn in the volume. The eye cannot see changes faster than about 1.5 Hz. Therefore, if the image to be displayed is repeatedly drawn faster than this rate, the image will appear to be steady, even though visible light may be originating from any one point in the volume only a small fraction of the time.

Upconversion systems, however, are limited because these systems must write a new pattern at every discrete depth, requiring timing, processing, and control computations that limit the refresh rate, especially for large images, and require extensive electronic support systems. In addition, the brightness, color palette and contrast are primarily controlled by one or more high brightness, single-color laser sources or by a nonlinear optical process that produces a 3-D image from within the image space. Both methods restrict the range of colors in the image and increase the cost of the display, and the nonlinear process has difficulties in producing images bright enough to see in typical room illumination.

To overcome the rendering limitations of the above referenced volumetric displays, some systems have employed high quality 2-D images projected onto an opaque screen which was mechanically driven by a rotary or oscillating mechanism. The screen may have been rotated about an axis, or oscillated, for example, but the surface was always facing a fixed direction. As a result, the display would sweep a display space distributing frames of a 2-D image depending on the angle of the screen and the viewing angle. Different shapes of screens have been employed, including flat, helical, and thin elongated members such as a rod, beam, or stick. While these systems allowed full-color, high-contrast images to be produced, the refresh rate, size of the display, and viewing angle were limited by the mechanical nature of the system.

Some attempts to produce 3-D visual displays have also employed light emitting diodes (LEDs), for instance, on rotating blades. Like other systems, rotating LED systems have some desirable qualities, but, again, they have limitations that have kept them from being widely adopted to produce 3-D or holographic effects.

As a result of the above referenced limitations, there remains a need for systems and methods for easily producing bright, full-color, high-contrast 3-D images that are viewable continuously and equally over a wide range of viewing angles without the need for a mechanically driven opaque screen.

BRIEF DESCRIPTION OF THE DRAWINGS

For a better understanding of the present disclosure, non-limiting and non-exhaustive embodiments are described in reference to the following drawings. In the drawings, like reference numerals refer to like parts through all the various figures unless otherwise specified.

DETAILED DESCRIPTION

The present inventive concepts will now be described more fully hereinafter with reference to the accompanying drawings, which form a part hereof, and which show, by way of illustration, specific exemplary embodiments by which the inventive concepts may be practiced. This inventive concepts may, however, be embodied in many different forms and should not be construed as limited to the embodiments set forth herein; rather, these embodiments are provided so that this disclosure will be thorough and complete, and will fully convey the scope of the inventive concepts to those skilled in the art. However, in some instances, well known or conventional details may not be described in order to not unnecessarily obscure the embodiments in detail. Among other things, the present inventive concepts may be embodied as methods or devices. Accordingly, the following detailed description is not to be taken in a limiting sense.

Reference throughout the specification to "at least some embodiments", "another embodiment", or "an embodiment" means that a particular feature, structure, or characteristic described in connection with the embodiment is included in at least some embodiments as described herein. Thus, the appearance of the phrases "in at least some embodiments" or "in an embodiment" in various places throughout the specification are not necessarily all referring to the same embodiment. Furthermore, the particular features, structures, or characteristics may be combined in any suitable manner in one or more embodiments.

Figure 1:
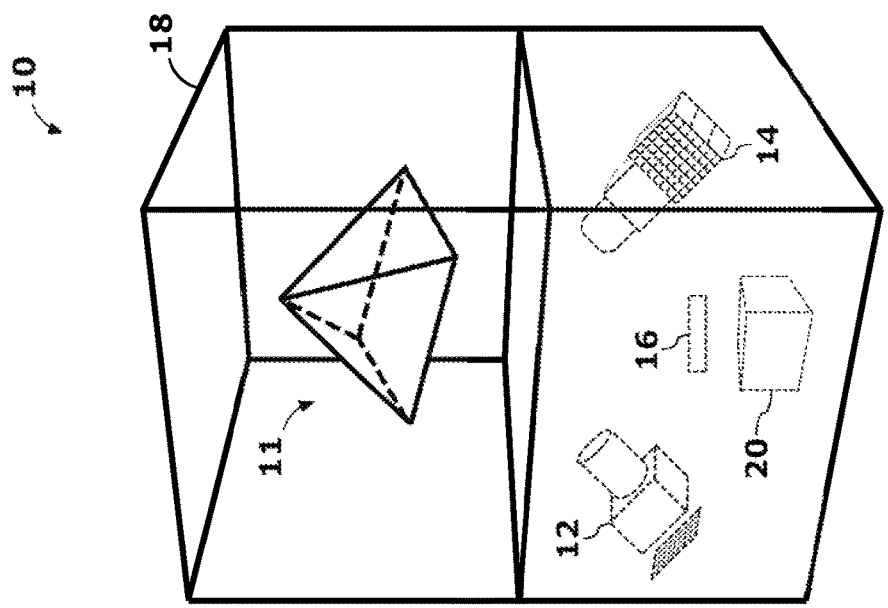
FIG. 1 is a schematic diagram of one exemplary embodiment of a three-dimensional display system providing a three-dimensional image within a volumetric image chamber.
Figure 1:
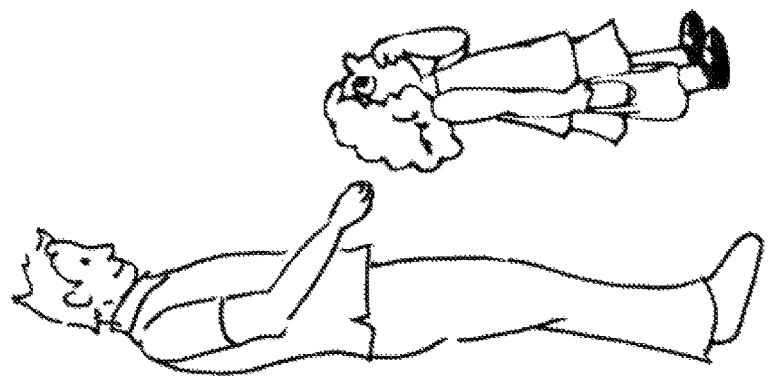
Figure 2:
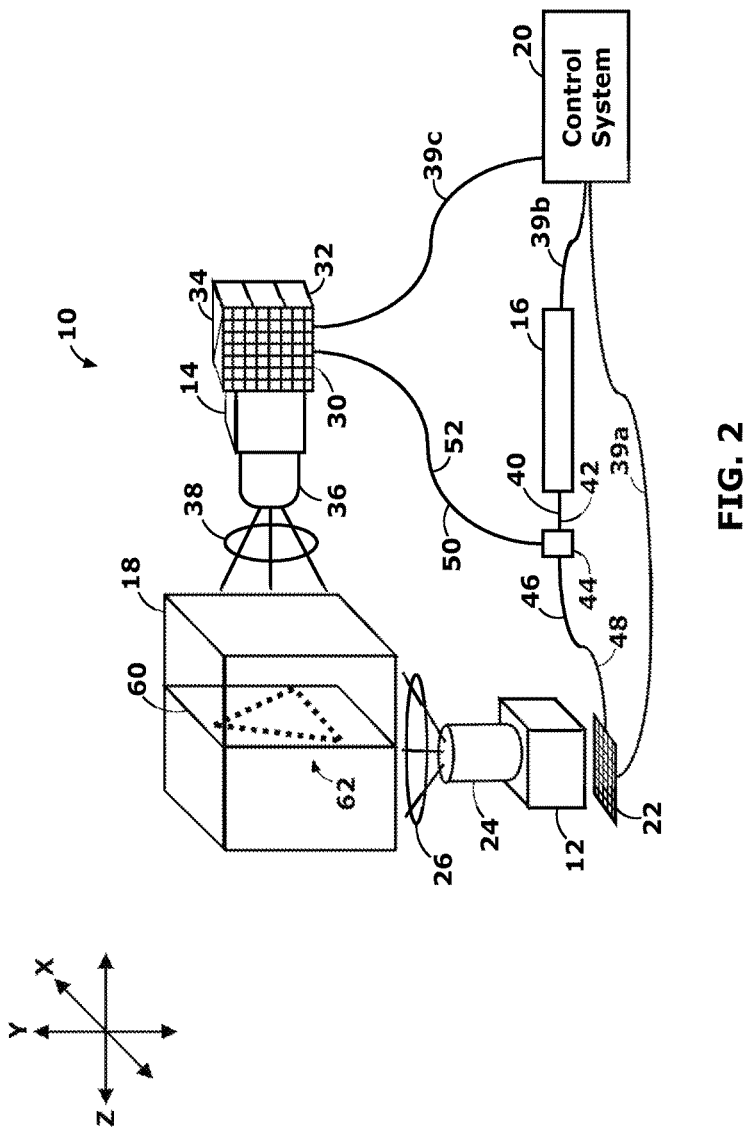
FIG. 2 is a schematic diagram of one exemplary embodiment of the three-dimensional display system providing a diffusion screen at a predetermined location within the volumetric image chamber.

Referring now to the figures, and in particular to FIGS. 1 and 2, a three-dimensional display system 10 is schematically shown. FIG. 1 shows the three-dimensional display system 10 displaying a 3-D image 11. FIG. 2 schematically shows an exemplary embodiment of the three-dimensional display system 10 having an addressing system 12, an image writing/illumination system 14, a single-frequency laser module 16, an image chamber 18, and a control system 20. As shown in FIG. 1, the 3-D image 11 is displayed within the image chamber 18. As will be described in more detail below, in one embodiment, the 3-D image 11 is decomposed into a plurality of cross-sectional 2-D images at particular cross-sectional locations within the 3-D image 11. Then, in a sequential process which steps through the cross-sectional locations, at each cross-sectional location, the three-dimensional display system 10 (1) creates one or more diffusion screen within the image chamber 18 at the cross-sectional location, (2) supplies visible light in the form of the 2-D cross-sectional image onto the one or more diffusion screen to refract the visible light and provide views of the 2-D cross-sectional image at multiple different viewing angles around the image chamber 18, and (3) erases the one or more diffusion screen.

The image chamber 18 is constructed of one or more materials that is/are configured to pass visible light and in which refractive indexes of particular and distinct locations within the material can be varied (e.g. set, stored and erased) in a predetermined manner to create and erase the diffusion screens. In one embodiment, the image chamber is constructed of a material having photo-refractive properties. The image chamber 18 can be constructed entirely or at least partially of a non-fluorescing, non-upconversion material. For example, the materials that may be used to make the image chamber 18 may include one or more particles that support a photorefractive process that converts spatial variations in optical intensity into spatial variations in the material's refractive index. Materials may include, but are not limited to, photothermoplatics, photorefractive crystals, photorefractive polymers, photoaddressable polymers, photopolymers, nanoparticle-based materials, microparticle-based materials, and glasses. Key parameters of interest for all of these materials include a time required to write a refractive index grating into particular locations within the material, the time required to erase the refractive index grating, the magnitude of the refractive index change, related to the contrast of the refractive index grating, caused by a given change in intensity, the optical clarity of the material (how much light is scattered by the material, even when no refractive index gratings are present), and the cost of the material. Several materials and their characteristics that can be used to make the image chamber 18 will be discussed below by way of non-limiting examples.

As discussed above, the image chamber 18 may be constructed of photorefractive crystals, e.g., certain bulk crystals that are configured to support the photorefractive effect that is desirable for use in the display. To cause the photorefractive effect, the crystals absorb light by trapped electrons allows the electrons to move freely and migrate through the crystal lattice where they are trapped again in adjacent unexposed regions. The spatially varying electric field that results from the variation in density of charged particles modulates the refractive index through the electro-optic effect. Inorganic ferroelectric crystals such as iron-doped lithium niobate (LiNbO3) and lithium tantalate (LiTaO3) have shown particular affinity for supporting efficient transfer of variations in intensity into changes in refractive index. Once a crystal material with the best combination of these properties is identified, the material is constructed as a solid crystal that is ideally homogeneous in its underlying crystalline structure. The bulk crystal can be grown using any number of commercially viable methods. In the ideal case a single uniform crystal is grown to the exact dimensions of the targeted image chamber. In other words, the image chamber 18 can ideally be a single uniform crystal. It is also possible that the image chamber 18 can be constructed by optically gluing several pieces of crystals to form a large size image chamber.

As another example, the image chamber 18 can be constructed of photorefractive polymers. In photoreactive polymers, the photorefractive effect arises in a similar manner to that of photorefractive crystals, except that the mobile charges are holes rather than electrons, and strong electric fields must be applied to support charge migration and enhance the electro-optic effects. Photorefractive polymers are amorphous materials, making them easier to mold into different and larger shapes that may be more conducive to use in certain applications.

As yet another example, the image chamber 18 can be constructed of photoaddressable polymers. Photoaddressable polymers consist of polymer materials that change their molecular configuration when exposed to light. This reaction to light is a local effect, meaning that the change in configuration occurs only at the site of exposure, and there is no requirement for diffusion on the molecular or electron level to create the change in the optical parameters of the material. By removing the need for diffusion, the potential exists for decreasing the write time of the material and improving contrast. Photoaddressable polymers primarily consist of azobenzene that contains liquid crystalline co-polymers. The azobenzene chromophores can exist in one of two isomeric states, i.e., a trans state and a cis state. In the trans state, the polymer molecules stretch into an elongated rod-like form. In the cis state, the molecule kinks and bends. Exposure to light of the correct wavelength can induce a change, called isomerization, from the cis state to the trans state and from the trans state to the cis state. The state of the material under equilibrium conditions depends only on the wavelength of the light and the temperature of the sample. Some materials that may be utilized for the main polymer chain include polyacrylates, polymethacrylates, polysiloxanes, polycarbonates, polyurethanes, polyimides, and aliphatic polyesters. Other advantages of the material include large, long-term stable changes in refractive index up to 0.5 which provide stable and high contrast refractive index modulation, an amorphous nature that allows simple processing and shaping, dry recording, and the ability to erase the refractive index changes that permits the writing and erasing of refractive index grating elements as needed.

As yet another example, the image chamber 18 can be constructed of photopolymers. Photopolymers are systems of organic molecules that function through the process of photoinitiation of polymerization to record volume diffractive elements to form refractive index gratings, as desired. These materials possess high light sensitivity, rapid writing time, and good stability of recorded variations, and are currently one of the most cost effective materials available for creating the image chamber 18. A photopolymer system typically consists of one or more monomers, a photoinitiation system and a binder that is insensitive to light and does not contribute to the photopolymerization. The binder is, however, critical to the physical properties of the photopolymer, including rigidity and stability over long exposure to the environment. Common monomers used in these systems include acrylamide, dimethylacrylamide, 2-hydroxiethylmethacrylate, vinyl acetate, and acrylic acid, as these materials provide the material with high sensitivity, large dynamic range, and minimal shrinkage of the material upon exposure. The photoinitiation system may consists of a dye combined with an electron donor that are absorbing at the wavelength of the laser used to write the refractive index grating elements, which may also be described herein as "diffractive elements." The absorbed energy is transferred in one of several ways to free radicals that can then initiate the polymerization reaction. Common photosensitive dyes include methylene blue, yellowish eosin, brillian green, and rose bengal. Common electron donors include triethanolamine, diethanolamine, ethanolamine, triethylamine, diethylamine, N-phenyl glycine, diphenyl iodonium choride, amongst others.

As yet another example, the image chamber 18 can be constructed of nanoparticle-based materials. Nanoparticle-based materials are a group of materials that are comprised of nanoparticles dispersed in a host material. Nanoparticles are structures that have dimensions on the order of tens of nanometers. Nanoparticles may consist of semiconductor structures, miniature crystals that may or may not contain dopant atoms, or similar material systems. For the image chamber 18, the nanoparticles must be constructed of materials that display optical behaviors and responses that mimic that of the photorefractive materials. The nanoparticles may or may not be encapsulated in a coating layer. If the coating layer is present, it may contain active materials that contribute to the intended function of the nanoparticle or it may contain only passive materials that do not directly contribute to the nanoparticle's function. Once constructed, the nanoparticles may be dispersed in a host material by one of several common processes. The host material may be a liquid or a solid, and can include polymers, epoxies, and similar materials that are initially viscous and then subsequently solidify. This composite material may be used to fill the image chamber 18 and host the diffractive elements to be created.

As yet another example, the image chamber 18 can be constructed of microparticle-based materials. Microparticle-based materials are different from nanoparticle materials in that the microparticles are structures that have dimensions on the order of tens of micrometers rather than nanometers. Similarly to nanoparticles, microparticles may consist of semiconductor structures, miniature crystals that may or may not contain dopant atoms, or similar material systems. Microparticles can be obtained by controlled growth and manufacturing processes or by the grinding of bulk crystals of the material into micrometer size pieces. Microparticles are generally not encapsulated in a coating as the surface area is much smaller in proportion to the volume of the particle, and surface effects are of less concern. Once constructed, the microparticles may be dispersed in a host material by one of several common processes. The host material may be a liquid or a solid, and can include polymers, epoxies, and similar materials that are initially viscous and then subsequently solidify. This composite material may be used to fill the image chamber 18.

Many of the important parameters for the microparticle-based materials are similar to those of the nanoparticle-based materials. Index matching, particle size, dopant choice and density, and host material properties are again concerns for the same reasons noted for the nanoparticle-based materials and will not be repeated here. An additional concern for microparticles is the uniformity of the particles in terms of volume and shape. For the method where microparticles are constructed by crushing and grinding of a bulk material, the uniformity of shape and size is typically very poor, and thus the grating recording efficiency, refractive index scattering and the optical clarity of the composite material may vary significantly throughout the material volume. This results in the creation of images with non-uniform intensity and contrast, which is undesirable. Microparticles formed by controlled growth have far less variability, but any variability will be more notable, since there will generally be a smaller number of particles present in the voxel volume and variability in the microparticle properties will be less likely to average out across the fewer particles. The larger particles are now on the same dimension of all of the optical wavelengths used in the three-dimensional display system 10, so index matching may be more critical to avoid the diffraction effects that deteriorate the image quality.

Another possible material used for the image chamber 18 is a glass material doped with appropriate choices of ions that support the processes needed to induce stable variations in the optical properties of the glass to create, store and erase the diffusion screens at particular locations within the image chamber 18. The glass material can be assembled or grown using any of several commercially viable methods. Glasses have the advantage of being amorphous materials that can be grown and shaped into image chambers of different dimensions and volumes and do not require precise crystalline assembly. The dimensions and volumes attainable for glasses are limited primarily by the equipment used to produce the glasses. Current processes for doping the glasses and physical constraints limit the maximum doping concentration that can be achieved. The limit on the number of dopant ions per unit volume limits the resolution and efficiency that can be achieved in each voxel of the three-dimensional image 11.

As discussed above and shown in FIG. 2, the three-dimensional display system 10 has the addressing system 12, the image writing/illumination system 14, the single frequency laser module 16, the image chamber 18, and the control system 20. The single frequency laser module 16 is a laser which operates on a single resonator mode, so that the laser emits quasi-monochromatic radiation with a very small linewidth and low phase noise. The single frequency laser module 16 operates typically in the ultraviolet spectrum but may also operate in bands of the visible spectrum or infrared spectrum for which the image chamber 18 is reactive.

The addressing system 12 of the three-dimensional display system 10 may be provided with a scanning optical system 22, at least one lens 24, and may be configured to project a first directed optical energy 26.

The image writing/illumination system 14 of the three-dimensional display system 10 may be provided having an image writing system 30, an illumination system 32, an optical combiner 34, at least one lens 36, and may be configured to project a second directed optical energy 38. The three-dimensional display system 10 may further be provided with a connection 39a, a connection 39b, a connection 39c, a first beam path 42, a beam splitter 44 to provide an addressing beam 46 to a second beam path 48, and a data beam 50 to a third beam path 52.

The connection 39a establishes communication between the control system 20 and the scanning optical system 22 to permit the control system 20 to supply information to and control the scanning optical system 22 as described below. The connection 39b establishes communication between the control system 20 and the single-frequency laser module 16 to permit the control system 20 to selectively actuate and deactuate the single-frequency laser module 16. The connection 39c establishes communication between the control system 20 and the image writing system 30 and the illumination system 32 to permit the control system 20 to supply the 2-D pattern to the image writing system 30 and the 2-D image slices to the illumination system 32 and to control the image writing system 30 and the illumination system 32.

The first beam path 42 connects an output port of the single-frequency laser module 16 to the beam splitter 44 so that an optical beam supplied by the single-frequency laser module 16 is provided to the beam splitter 44. The beam splitter 44 splits the optical beam into the addressing beam 46 and the data beam 50, preferably, such that the addressing beam 46 and the data beam 50 are coherent. The addressing beam 46 is supplied to the scanning optical system 22 via the second beam path 48, and the data beam 50 is supplied to the image writing system 30 via the third beam path 52. The first, second and third beam paths 42, 48 and 52 may be fiber optic cables or free-space.

The addressing beam 46 is guided by the scanning optical system 22 and the lens 24 to form the first directed optical energy 26. The first directed optical energy 26 is supplied into the image chamber 18 in the form of a plane that creates a voxel slice 60. The voxel slice 60 is intersected by the second directed optical energy 38 generated from the image writing system 30 to create a diffusion screen 62 within the image chamber 18. The addressing system 12 serves to specify the location of the diffusion screen 62 within the image chamber 18 by directing the voxel slice 60 to the desired location of the diffusion screen 62. The image writing system 30 of the image writing/illumination system 14 receives the data beam 50, which is in-coherence with the addressing beam 46, and serves to specify the content or configuration of the diffusion screen 62 by creating the second directed optical energy 38 in a predetermined pixilated pattern. The diffusion screen 62 is set to refract the 2-D image slice in all horizontal, slanted, or vertical directions or a limited angle of view upon a desired field of view. Thus, in one embodiment, all of the diffusions screens 62 created in the image chamber 18 are identical. The diffusions screens 62 can be created so as to be spaced apart, and in particular locations corresponding to a location of the voxel slices 60 as shown in FIGS. 5A-5D, for example. Once the diffusion screen 62 is created, the illumination system 32 supplies visible light in the form of the 2-D image slice onto the diffusion screen 62 to create the 2-D image within the image chamber 18.

The scanning optical system 22, the image writing system 30 and the illumination system 32 may be constructed in a variety of manners, such as switch arrays having multiple rows and multiple columns which may be configured to direct light of different wavelengths that may be, in some instances projected in a visible spectrum, and in some instances in a spectrum not visible to the human eye. In one embodiment of the three-dimensional display system 10, at least one of the scanning optical system 22, the image writing system 30 and the illumination system 32 may be a digital micromirror device (DMD) as is known in the art. The DMD device may be built on a silicon wafer and consists of an array of small mirrors that are suspended above an air gap. The mirrors are suspended from flexible silicon frames that are free to flex when a voltage is applied to electrical connections attached to the frame. In a common construction of the DMD, the mirror is in one orientation when no voltage is applied, and the mirror rotates to a new position when a voltage is applied. Light energy incident on the mirror is therefore directed to a first output direction for no applied voltage and a second output direction when a voltage is applied. A voxel is selected or not selected by applying the correct voltage level to the mirror that corresponds to the voxel location within the voxel slice 60. For example, an entire row or column of the mirrors in the switch array of the scanning optical system 22 can be selected, and all other rows or columns de-selected so as to project the first directed optical energy in the form of a plane at predetermined locations within the image chamber 18. The 2-D pattern can be received and used by the image writing system 30 to create an interference pattern that will set the predetermined location within the image chamber 18 into the diffusion screen 62. The 2-D pattern controls the characteristics of the diffusion screen 62 so that the visible light supplied by the illumination system 32 refracts into a desired field of view.

Light is then either directed toward the lens 24 or 36 and the image chamber 18 (voxel is illuminated) or directed away from the image chamber 18 (voxel is not illuminated). The DMD is commonly mounted on a printed circuit board that contains the circuitry, power supplies, microprocessors and other electronic systems for correctly driving the DMD. This electronics board is commonly referred to in the art as a digital light processing (DLP) board.

In another embodiment, one or more of the scanning optical system 22, the image writing system 30 and the illumination system 32 may be a grating light valve (GLV) device built on a silicon wafer. In this example, the grating light valve in one or more of the scanning optical system 22, the image writing system 30 and the illumination system 32 may have a plurality of switches with each switch having parallel rows of highly reflective micro-ribbons suspended above an air gap. The ribbons are a few μm in length and width and have a top layer of aluminum to make them reflective. The ribbons are configured to alternate between static ribbons which do not move and active ribbons that can be moved when a voltage is applied. Individual electrical connections to each ribbon electrode provide for independent movement. The ribbons and the substrate are electrically conductive. When the voltage of the active ribbons is set to ground potential, all ribbons are undeflected, and the switch acts as a standard mirror and directs light to one output direction. When a voltage is applied between the ribbon and base conductor the active ribbon deflects downward toward the substrate. This deflection creates diffraction effects on incident light causing the light to be reflected at a different angle than that of the undeflected ribbons. The wavelength to diffract is determined by the spatial frequency of the ribbons. As this spatial frequency is determined by the photolithographic mask used to form the GLV device in the CMOS fabrication process, the output angles can be very accurately controlled.

In still another embodiment, one or more of the scanning optical system 22, the image writing system 30 and the illumination system 32 may be a liquid crystal display or LCD. The LCD consists of cells of liquid crystalline materials sandwiched between conductive plates. Polarizers are placed on the outside of both plates. The size of the cells is controlled by the process used to create the liquid crystal layer and to pattern the electrodes on the plates. Several different types of liquid crystalline materials can be used, all of which have the property that the orientation of the molecules within the material can be controlled by a voltage placed across the conductive plates. The polarization of the light traveling through each cell is affected by the orientation of the liquid crystal molecules and the polarizer on the input plate. In the most common configuration, when no voltage is applied the polarization of the light exiting the liquid crystal is such that all of the optical power is blocked by the polarizer on the output plate. When the correct voltage is applied across the plates, the polarization of the light exiting the liquid crystal is such that all of the optical power is passed by the output polarizer and thus this power can continue on to the lens 24 or 36 and illuminate the selected voxel. The LCD typically switches slower than the DMD and much slower than the GLV, and thus limits the speed at which successive 2-D slices of the 3-D image 11 can be addressed. The LCD is the most limiting of the switch arrays on the number of times the 3-D image 11 can be created per unit time, and therefore the image size will be most constrained. An advantage of the LCD approach is the ability to control the output optical power in an analog manner rather than the simple on-off function of the GLV and DMD. This provides the ability to control the intensity of the voxel emission at the switch array location rather than using an additional control system 20.

In another embodiment of the three-dimensional display system 10, the scanning optical system 22 and the image writing system 30 may be one type of switch array, for instance a DMD, configured to direct the addressing beam 46 and the data beam 50 into the image chamber 18 to create the diffusion screen 62, and the illumination system 32 may be another type of switch array configured to direct visible light through the lens 36 to the image chamber 18 to create the 2-D image.

As shown in FIG. 2, in one embodiment the image writing system 30 and the illumination system 32 supply light into the optical combiner 34. The optical combiner 34 directs the light through the lens 36 and into the image chamber 18. In such an embodiment, the optical combiner 34 allows the switches at the same location in each the image writing system 30 and the illumination system 32 to be responsible for directing light output to the same voxel in the voxel slice 60 within the image chamber 18. The optical combiner 34 can be a prism. Other possible optical combiners, include but not limited to mirrors, and beam splitters that possess wavelength selective reflection and transmission properties. The light output from the image writing system 30 and the illumination system 32 pass through the optical combiner 34 and the image writing system 30 and the illumination system 32 are aligned such that outputs from the same switch location in the image writing system 30 and the illumination system 32 overlap at the optical combiner 34. In this method, only a single lens system 36 is needed to direct the light from the image writing system 30 and the illumination system 32 to the voxel slice 60. Other methods may be used, such as using a separate lens system for the image writing system 30 and the illumination system 32.

The lenses 24 and 36 have several functions to perform. First, the lenses 24 and 36 transform the spacing of the switches in the scanning optical system 22, the image writing system 30 and the illumination system 32 into the spacing of the voxels required in the voxel slice 60. Second, the lenses 24 and 36 must ensure that all of the light from a given switch in the scanning optical system 22, the image writing system 30 and the illumination system 32 is imaged to the targeted area of the voxel in the voxel slice 60. Third, the lenses 24 and 36 must ensure that the shape of the first and second directed optical energy 26 and 38 wavefronts are of the appropriate shape to create the desired interference pattern within the voxel location in the image chamber 18. Obtaining the correct shape of the wavefront is critical to obtaining the correct combination of diffraction surfaces in the diffraction screen 62 that will direct light from the illumination system 32 through a wide range of angles. A fourth potential function of the lenses 24 and 36 is to provide the means for implementing one of the different types of multiplexing that may be employed to create the required overlapping refractive index gratings.

Typically, a minimum of two lenses 24 and 36 are required for the three-dimensional display system 10 to perform each of these functions. In a high performance system, additional secondary lenses may be added to compensate for aberrations and distortions caused by the two lenses 24 and 36. This compensation is designed such that the size of each voxel and the shape of the wavefront at the voxel are constant across the voxel slice 60, and that all voxels are generated at the proper depth within the image chamber 18.

Depending on the choice of the illumination system 32, additional lens systems may be needed between the illumination system 32 and the optical combiner 34. For example, if the illumination system 32 is a digital projector, where the switch array requires three switches, one for red, one for green, and one for blue, to compose one equivalent voxel in the image array, an additional lens system may be needed to combine the light beams from the three switches into a single light beam corresponding to one voxel in the voxel slice 60 and entering the optical combiner 34 at the correct location for each targeted voxel.

Another option for the lenses 24 and 36 is to use multiple arrays of lenses, with each lens in the array corresponding to one voxel in the voxel slice 60. Such an arrangement would allow individual control of the first directed optical energy 26 and the second directed optical energy 38 for each voxel, if needed. This may be most important for a rotational slice approach (see FIG. 5d), where each column of the 3-D image 11 is potentially located at different depths in the image chamber 18, and the voxels in each column may require different separations between the lenses 24 and 36 in order to achieve the same wavefront shape at each of these different depths.

For multiplexing purposes, several different implementations within the image writing/illumination system 14 may be used, depending in part on the choice of multiplexing employed [e.g., a particular type of multiplexing is described in Reference 1]. For shift multiplexing, one option is to shift the lens 36 relative to the optical combiner 34 and the image chamber 18 by small amounts. This can be accomplished if the lens 36 is designed such that shifting the lens 36 short distances away from its initial position simply shifts the location of the second directed optical energy 38 within the voxel but does not change the wavefront of the second directed optical energy 38. Another method of shifting the second directed optical energy 38 location is a transparent plate or prism with parallel sides that can be rotated about one or more axes by small amounts. Phase coded multiplexing would require the placement of an SLM in the path of the second directed optical energy 38 to provide the required phase changes in the writing beam and/or erasing beams. The implementation of angular multiplexing will depend on the range of angles required as compared to the range of viewing angles that need to be achieved. For very small angles, the lens 36 may be designed such that shifting the lens 36 short distances away from its initial position causes both a shift in the position of the second directed optical energy 38 as it exits the lens 36 and an angular deflection of the second directed optical energy 38 from its original path. Increases in the shift distance increase the angular deflection of the second directed optical energy 38. Larger angular deviations may require multiple image writing/illumination system 14, one at each angle to be employed, a more sophisticated lens 36 design where the lenses within the overall system can be moved with respect to one another and the image writing system 30 and illumination system 32, or placement of the entire image writing/illumination system 14 on the edge of a rotating plate or similar system in order to scan the image writing/illumination system 14 through the range of angles. Periostropic multiplexing is most easily achieved if the image space can be rotated. However, this approach is not practical in all possible implementations or applications of the three-dimensional display system 10. Other options include the rotation of the image writing/illumination system 14 and the use of one or more rotating optical elements to effectively rotate the orientation of the output of the lens 36.

In operation of one embodiment of the three-dimensional display system 10, the addressing system 12 may be configured to direct the first directed optical energy 26 from the addressing beam 46 along one of more vertical planes (or voxel slices 60) through the image chamber 18. Each voxel slice 60 provides one of the two interfering beams that are needed to create the refractive index gratings that make up the diffusion screen 62. The scanning optical system 22 may be configured to form the first directed optical energy 26 such that the first directed optical energy 26 has the same depth along the z axis and is no wider along the x axis than the image chamber 18. Or, in other words, the scanning optical system 22 may be configured to form the first directed optical energy 26 having the same width as the image chamber 18 and the depth of the first directed optical energy 26 is no larger than the targeted depth of one voxel over the entire height of the image chamber 18. The addressing system 12 may further be configured to move the first directed optical energy 26 throughout the depth dimension (along the z axis) of the image chamber 18 wherein each voxel slice 60 is no larger than the width of the image chamber 18 and no deeper than the width of a single voxel over the entire height of the image chamber 18 without disrupting the beam shape or propagation direction. That is, the first directed optical energy 26 must remain a thin rectangle in cross-section and must always propagate in the vertical direction in the example shown in FIG. 2. The shaping of the first directed optical energy 26 may be performed by an optical line generating system and positioning of the first directed optical energy 26 at a series of distinct and parallel positions may be achieved using a DMD, or a GLV as discussed above. Such systems are known in the art and described, for instance, in U.S. Pat. No. 8,247,755 to Refai et al. which is hereby incorporated by reference. Other types of optical line generating systems can be used, such as the optical line-generating systems disclosed in U.S. Patent Publication No. 2015/0029315 to Refai et al., which disclosure is hereby incorporated herein by reference.

In operation of one embodiment of the three-dimensional display system 10, the image writing/illumination system 14 may be configured to direct the second directed optical energy 38 formed from the data beam 50 from the single-frequency laser module 16 to selected voxels within the image chamber 18 that contribute to the overall 3-D image 11 to be displayed. The image writing system 30 may have the ability to select which voxels will receive the second directed optical energy 38 configured from the data beam 50 from the single-frequency laser module 16. The image writing system 30 may further have the ability to control the properties of the beam of light, including dimensions, rate of convergence or divergence, and position, at the voxel location to achieve the desired voxel height and width and to achieve the desired diffusion screen 62 to be recorded by the image chamber 18 material. An array of optical or mechanical switches may be placed in the path of the data beam 50 and configured to select the voxels to be illuminated.

The illumination system 32 can be a visible imaging projector that is configured to project a 2-D image through the optical combiner 34 and the lens 36 so that someone looking toward the image chamber 18 would be able to see the light from the element from many different directions. The 2-D image can be in any suitable format, such as a .jpeg, a .mpeg, a .tiff or the like. The construction and operation of a visible imaging projector is known in the art and such will not be described in detail herein. A brightness, color palette and contrast are primarily set by the visible imaging projector, which may simply be a standard digital light projector. In other technologies, these properties are controlled by one or more high brightness, single-color laser sources or by a nonlinear optical process that produces a 3D image from within the image space. Light of the appropriate color and brightness is directed from each pixel of the illumination system 32 to the corresponding diffractive element-containing voxel within the image chamber 18. The diffractive element(s) within the voxel distribute this visible light into a wide range of directions (viewing angles) so that an observer can view the voxel from a wide range of angles. The image within the diffusion screen 62 is viewed as the combination of all of the light distributed from all of the activated voxels within the diffusion screen 62.

Figure 3:
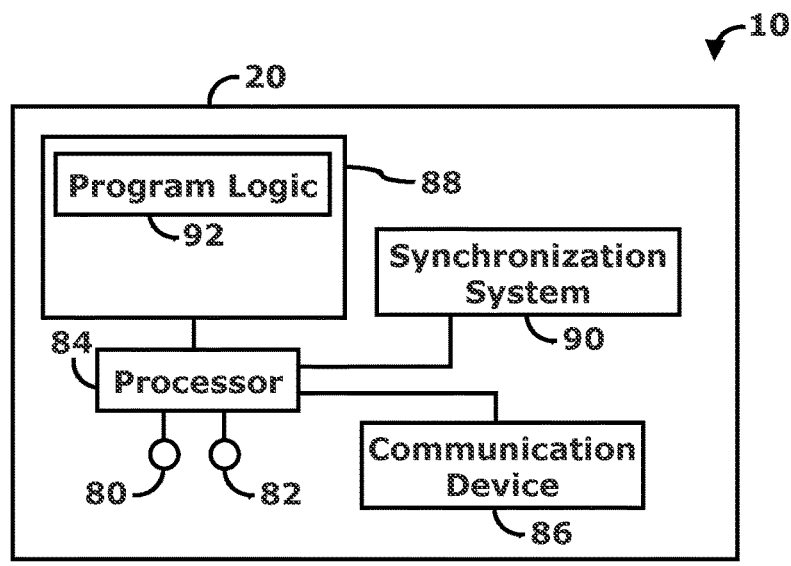
FIG. 3 is a schematic view of an exemplary control system for use in the three-dimensional display system illustrated in FIG. 1.

As shown in FIG. 3, the control system 20 of the three dimensional display system 10 may include one or more input devices 80, one or more output devices 82, one or more processors 84, one or more non-transitory computer readable storage media 88, program logic 92, and a synchronization system 90. As shown in FIG. 3, the program logic 92 may be stored on non-transitory computer readable storage media 88 accessible by the processor 84 of the control system 20. It should be noted that program logic 84 is another term for instructions and/or hard wired logic which can be executed by the processor 84.

In some embodiments, the control system 20 may comprise one or more processors 84 working together, or independently to, execute processor executable code stored on the one or more non-transitory storage media 88. Each element of the control system 20 may be partially or completely network-based or cloud-based, and may or may not be located in a single physical location.

The processor 84 may be implemented as a single processor or multiple processors working together, or independently, to execute the program logic 92 as described herein. It is to be understood, that in certain embodiments using more than one processor 84, the processors 84 may be located remotely from one another, located in the same location, or comprising a unitary multi-core processor. The processors 84 may be capable of reading and/or executing processor executable code and/or capable of creating, manipulating, retrieving, altering, and/or storing data structures into the one or more non-transitory storage media 88.

Exemplary embodiments of the processor 84 may be include, but are not limited to, a digital signal processor (DSP), a central processing unit (CPU), graphics processing unit (GPU), a field programmable gate array (FPGA), a microprocessor, a multi-core processor, combinations, thereof, and/or the like, for example. The processor 84 may be capable of communicating with the one or more non-transitory storage media 88 via a path (e.g., data bus). The processor 84 may be capable of communicating with the input devices 80 and/or the output devices 82.

The processor 84 may be further capable of interfacing and/or communicating with the addressing system 12, the single-frequency laser module 16, and/or the image writing/illumination system 14 as described above by exchanging signals (e.g., analog, digital, optical, and/or the like) via one or more ports (e.g., physical or virtual ports) via the synchronization system 90 and/or the communication device 86.

The one or more non-transitory storage media 88 may be capable of storing processor executable code. Additionally, the one or more non-transitory storage media 88 may be implemented as a conventional non-transient memory, such as for example, random access memory (RAM), CD-ROM, a hard drive, a solid state drive, a flash drive, a memory card, a DVD-ROM, a disk, an optical drive, combinations thereof, and/or the like, for example.

In some embodiments, the one or more non-transitory storage media 88 may be located in the same physical location as the control system 20, and/or one or more non-transitory storage media 88 may be located remotely from the control system 20. For example, the one or more non-transitory storage media 88 may be located remotely from the processor 84 and communicate with the processor 84 using the communication device 86. Additionally, when more than one non-transitory storage media 88 is used, a first non-transitory storage media 88 may be located in the same physical location as the processor 84, and additional non-transitory storage media 88 may be located in a remote physical location from the processor 84. Additionally, one or more non-transitory storage media 88 may be implemented as a "cloud" non-transitory storage media (i.e., one or more non-transitory storage media 88 may be partially or completely based on or accessed using the communication device 86).

The one or more input devices 80 may be capable of receiving information input from a user and/or processor(s), and transmitting such information to other components of the control system 80 and/or the addressing system 12, the image writing/illumination system 14, the single-frequency laser module 16, and/or the image chamber 18. The one or more input devices 80 may include, but are not limited to, implementation as a keyboard, touchscreen, mouse, trackball, microphone, fingerprint reader, infrared port, slide-out keyboard, flip-out keyboard, cell phone, PDA, remote control, fax machine, wearable communication device, network interface, combinations thereof, and/or the like, for example.

The one or more output devices 82 may be capable of outputting information in a form perceivable by a user and/or processor(s). For example, the output devices 82 may include, but are not limited to, implementations as a computer monitor, a screen, a touchscreen, a speaker, a website, a television set, a smart phone, a PDA, a cell phone, a fax machine, a printer, a laptop computer, combinations thereof, and the like, for example. It is to be understood that in some exemplary embodiments, the input device 80 and the output device 82 may be implemented as a single device, such as, for example, a touchscreen or a tablet. It is to be further understood that as used herein the term user is not limited to a human being, and may comprise, a computer, a server, a website, a processor, a network interface, a human, a user terminal, a virtual computer, combinations thereof, and/or the like, for example.

Figure 4:
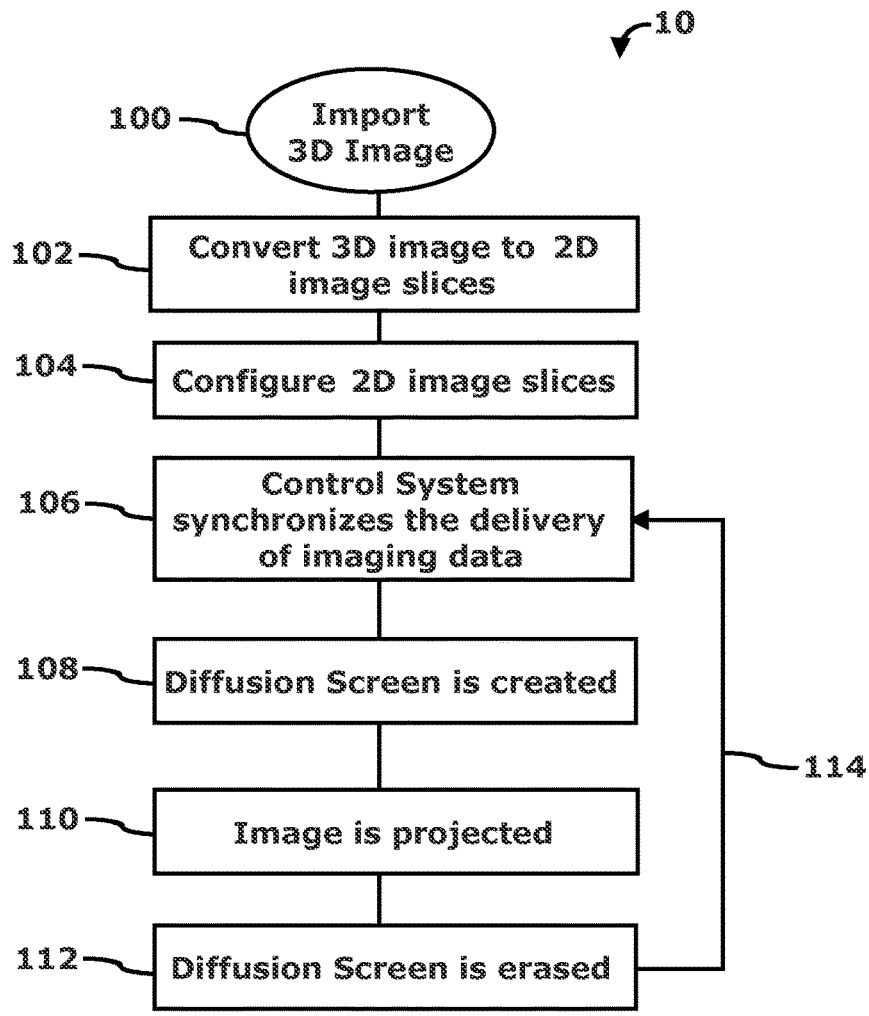
FIG. 4 is a block flow diagram showing the operation of the three-dimensional display system shown in FIG. 1.

Referring now to FIG. 4, shown therein is a flow diagram showing an exemplary process for displaying a three-dimensional image using the three-dimensional display system 10. As shown, the process may include a step 100 of importing the 3-D image 11 into the three-dimensional display system 10. The three-dimensional display system 10 may import files from different programs, including but not limited to, computer aided drawing (CAD) programs, other drawing programs, documents containing image data, and from any of a number of sources that produce numerical data of a three dimensional nature, including but not limited to medical imagers, scientific modeling programs, and radars.

Step 102 calls for the 3-D image 11 to be converted, for instance, by slicing the 3-D image 11 along a vertical, horizontal, or titled plane into a series of 2-D cross-sectional images, which may also be referred to herein as image slices. Step 102 may be carried out, for instance, by the processor 84 of the control system 20 utilizing the program logic 92 stored on the non-transitory computer readable storage media 88. The program logic 92 may be provided with modules or routines suited to deconstructing the data formats from each of the source programs listed above and reconstructing the data into the format required by the three-dimensional display system 10.

Step 104 calls for configuring the 2-D image slices into an output format. The output format may consist of the location and number of the vertical slices through the 3-D image 11 and the corresponding voxels that must be illuminated within each 2-D image slice so that the 3-D image 11 can be regenerated within the image chamber 18. The number of 2-D image slices and the number of voxels within each 2-D image slice may be determined by the capabilities of the addressing system 12, the image writing system 30 and the illumination system 32 which are known by the program logic 92. The program logic 92 then packages the 2-D imaging information in the format required for communicating this information to the respective systems 12, 30 and 32.

Step 106 calls for the control system 20 to synchronize the imaging data that is sent to the addressing system 12, the image writing system 30 and the illumination system 32 to create a representation of the 3-D image 11 in the image chamber 18. For instance, The control system 20 may be configured to synchronize the single-frequency laser module 16, the addressing system 12, and the image writing/illumination system 14 so that the voxel slice 60 and the second directed optical energy 38 simultaneously intersect at selected voxels within the image chamber 18 thereby activating the selected voxels creating the diffusion screen 62 as called for in step 108. More particularly, to create the diffusion screen 62, the control system 20 may send a signal along connection 39b to the single-frequency laser module 16 configured to cause the single-frequency laser module 16 to emit the beam 40 directed along the first beam path 42 to the beam splitter 44. The beam splitter 44 may split the beam 40 into the addressing beam 46 directed along the second beam path 48, and the data beam 50 directed along the third beam path 52. The control system 20 may also send a signal along the connection 39a to the addressing system 12 configured to trigger the scanning optical system 22 to direct the addressing beam 46 to expose the voxel slice 60 into a predetermined location of the imaging chamber 18 corresponding to the location of the next 2-D image slice. In addition, the control system 20 may also send a signal along the connection 39c configured to cause the image writing system 30 of the image writing/illumination system 14 to direct the data beam 50 to expose selected voxels within the voxel slice 60 corresponding to the diffusion screen data. All of these steps may be synchronized, for instance, by the synchronizing system 90 of the control system 20. The image writing/illumination system 14 controls which pixels receive optical power from the data beam 50 and which pixels do not, and image writing/illumination system 14 controls the shape of the second directed optical energy 38. When a square area (pixel) within the slice (area plus slice width is called a volume pixel or voxel) receives optical power from both the addressing system 12 and the image writing system 30 of the image writing/illumination system 14, the refractive index of the image chamber 18 within the activated voxel is changed as the first and second directed optical energy 26 and 38 interfere. This change in refractive index creates a diffractive element capable of scattering any light entering the voxel into many directions. In order to scatter as much light as possible into as many directions (angles) as possible, the process of creating the diffractive elements may need to be repeated several times for each 2-D image slice. Each time the 2-D image slice is addressed, one of the properties of the image writing/illumination system 14 (angle, position, rotation) is changed, allowing several diffractive elements to be written within the same voxel through a process called multiplexing [See Reference 1].

Once the diffusing screen 62 is created, step 110 calls for an image slice to be projected. In operation of one embodiment, the control system 20 may send a signal along connection 39c configured to cause the illumination system 32 of the image writing/illumination system 14 to project visible light in accordance with the 2-D imaging slice data directed to the activated voxels of the diffusion screen 62. The visible light may be diffracted and/or scattered over a wide angular range by the activated voxels so the light from each activated voxel is observable from a large range of directions. Light from the illumination system 32 will only illuminate the activated voxels that make up the diffusing screen 62. The illumination system 32 determines the color and brightness of each voxel within the image slice. Light of the appropriate color and brightness is directed from the illumination system 32 to the corresponding diffractive element-containing voxel within the image chamber 18. The diffractive element(s) within the voxel distribute this visible light into a wide range of directions (viewing angles) so that an observer can view the voxel from a wide range of angles. The 2-D image within the 2-D image slice is viewed as the combination of all of the light distributed from all of the activated voxels within the diffusion screen 62.

Step 112 calls for the diffusion screen 62 to be erased. In operation of one embodiment, the control system 20 may send a signal over connection 39b configured to cause the single-frequency laser module 16 to emit the beam 40 directed through the first beam path 42 to the beam splitter 44. In one embodiment, the beam 40 is a coherent laser beam. The beam splitter 44 splits the beam 40 into the addressing beam 46 and the data beam 50. The addressing beam 46 is directed through the second beam path 48 to the addressing system 12, however, the control system 20 sends a signal over connection 39a configured to cause the addressing system 12 not to direct or emit the addressing beam 46. The data beam 50 is directed along the third beam path 52 to the image writing/illumination system 14 which receives a signal from the control system 20 configured to cause the image writing system 30 to emit the second directed optical energy 38 to flood the image chamber 18. Uniform illumination (that may not contain any interference patterns) causes the charge carriers within the image chamber 18 to redistribute uniformly within the material. Since changes in the refractive index are directly tied to the density of the carriers, a uniform density of carriers results in a uniform (and hence constant) value of refractive index throughout the image chamber 18, and thus the refractive gratings are effectively erased. Or, in other words, the diffusing screen 62 is erased. This prevents these voxels from contributing ghost images to the output from other slices of the image later in the writing and reading process.

In step 114, a signal may be sent from the image writing/illumination system 14 to the control system 20 via the connection 39c configured to notify the control system 20 that the erasure process is complete. The control system 20 may then begin the process step 108 for the next 2-D image slice. In this manner, the control system 20 directs the image writing/illumination system 14 and the addressing system 12 to step appropriately through all of the 2-D image slices of the 3-D image 11 produced by the program logic 92. If the systems 20, 12, 14, 16 and 18 step through the 2-D slices quickly enough (e.g., around 20 times/second or more), the observer effectively sees all of the 2-D image slices simultaneously and therefore will see the 3-D image 11 represented within the image chamber 18. For continual viewing the entire image generation process described in FIG. 4 is repeated at a high enough rate that the human viewer does not perceive any variations in the intensity of the image (called flicker). To be successful, the entire 3D image 11 should be scanned through in less than 30 ms to produce a flicker-free three dimensional image.

As will be recognized by a person of ordinary skill in the art, the process of FIG. 4 is only one of the possible way for creating the 3-D image 11 in accordance with the present inventive concept and is presented by way of non-limiting description. For instance, erasing the diffusion screen in step 108 may be accomplished by flooding the image chamber 18 with optical power from either the addressing beam 46 or the data beam 50, but not both. Likewise, step 114 may not require a signal to be sent to the control system 20, but, instead be accomplished by timing, either mechanically or through program logic, as the control system 20 steps through the 2-D imaging data organized by the program logic 92.

There are several beam scanning patterns that can be utilized for projecting the 2-D image slices into the image chamber 18 to create the 3-D image 11, each corresponding to a given method for slicing the 3-D image 11 by the program logic 92. These methods are shown in FIGS. 5A-5D and described below.

Figure 5A:
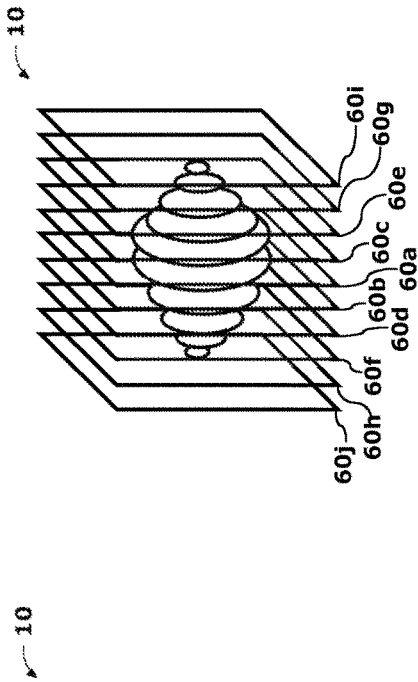
FIG. 5a-5d are schematic views of exemplary image slice scanning patterns for forming the diffusion screen at predetermined locations within the volumetric image chamber.

FIG. 5(A) is a schematic view of the image chamber 18 showing the image slices 60a-60j in a traditional translational scanning and slicing method. In this method, the 3-D image 11 is sliced into a set of 2-D parallel vertical planes that resemble pieces of paper stacked together. The control system 20 selects each slice 60a-60j in sequence, starting with the first slice 60a and progressing through all of the other slices 60b-60j before returning to the first slice 60a to start the next scan.

Figure 5B:
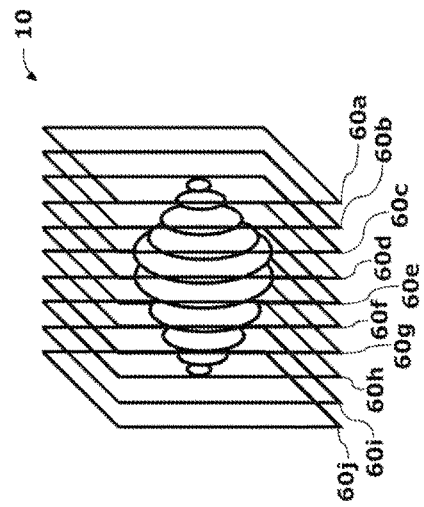

FIG. 5(B) is a schematic view of the image chamber 18 showing a forward and backward translational scanning and slicing method. In this method, the first 2-D image slice 60a of the 3-D image 11 is projected in the middle of the image chamber 18 (or in any starting line of the image chamber 18), and then the slices 60b-60j are projected forward and backward from the starting slice 60a. In one embodiment using this method, the slices 60b-60j may be projected sequentially alternating front to back relative to the first slice 60a. In another embodiment, the slices 60b-60j may be projected two at a time sequentially, i.e. slices 60b and 60c would be projected at the same time followed by slices 60d and 60e, moving outward from the first slice 60a.

Figure 5C:
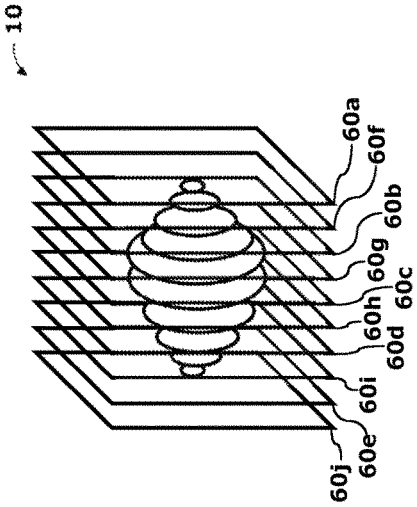

FIG. 5(C) is a schematic view of the image chamber 18 showing an odd and even translational scanning and slicing method. In this method, the addressing system 12 begins projecting slices 60a-60j at one end of the image chamber 18 and projects every other slice (for example, slices 60a, 60b, 60c, 60d, and 60e) and then returns to the first slice 60f of the alternate (skipped) slices to scan the remaining slices (for example, slices 60g, 60h, 60i, and 60j). The addressing system 12 returns to the first slice 60a of the original sequence to begin the next scan.

Figure 5D:
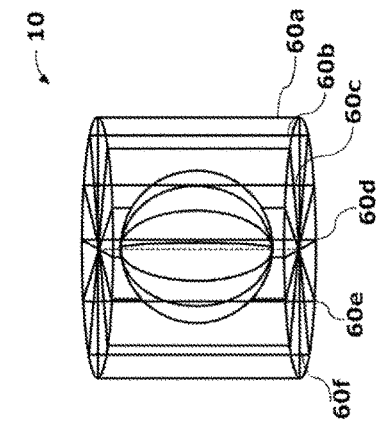

FIG. 5(D) is a schematic view of the image chamber 18 showing a rotational scanning and slicing method. In this method, the addressing system 12 begins at one orientation or angular rotation of the first slice 60a, and then rotates the slice 60a by fixed angular steps through a total angle of 180 degrees. Once all of the fixed angular steps of slice 60a have been projected, the control system 20 instructs the addressing system 12 to begin on the next rendering of the image on the next slice 60b. The control system 20 of the three-dimensional display system 10 sequentially progresses through each 2-D slice 60a-60f in this fashion until the entire 3-D image 11 has been rendered and then the control system instructs the addressing system 12 to begin the sequence over at the first slice 60a.

Although the rotational scanning and slicing method has been shown with each slice extending across the width of the image chamber 18, in another embodiment, the three-dimensional display system 10 may slice the 3-D image 11 in slices that begin at the center of the 3-D image 11 radiating out to the outer edge. Or, in other words, instead of the 6 slices shown in FIG. 5D, there would be 12 slices.

Figure 6:
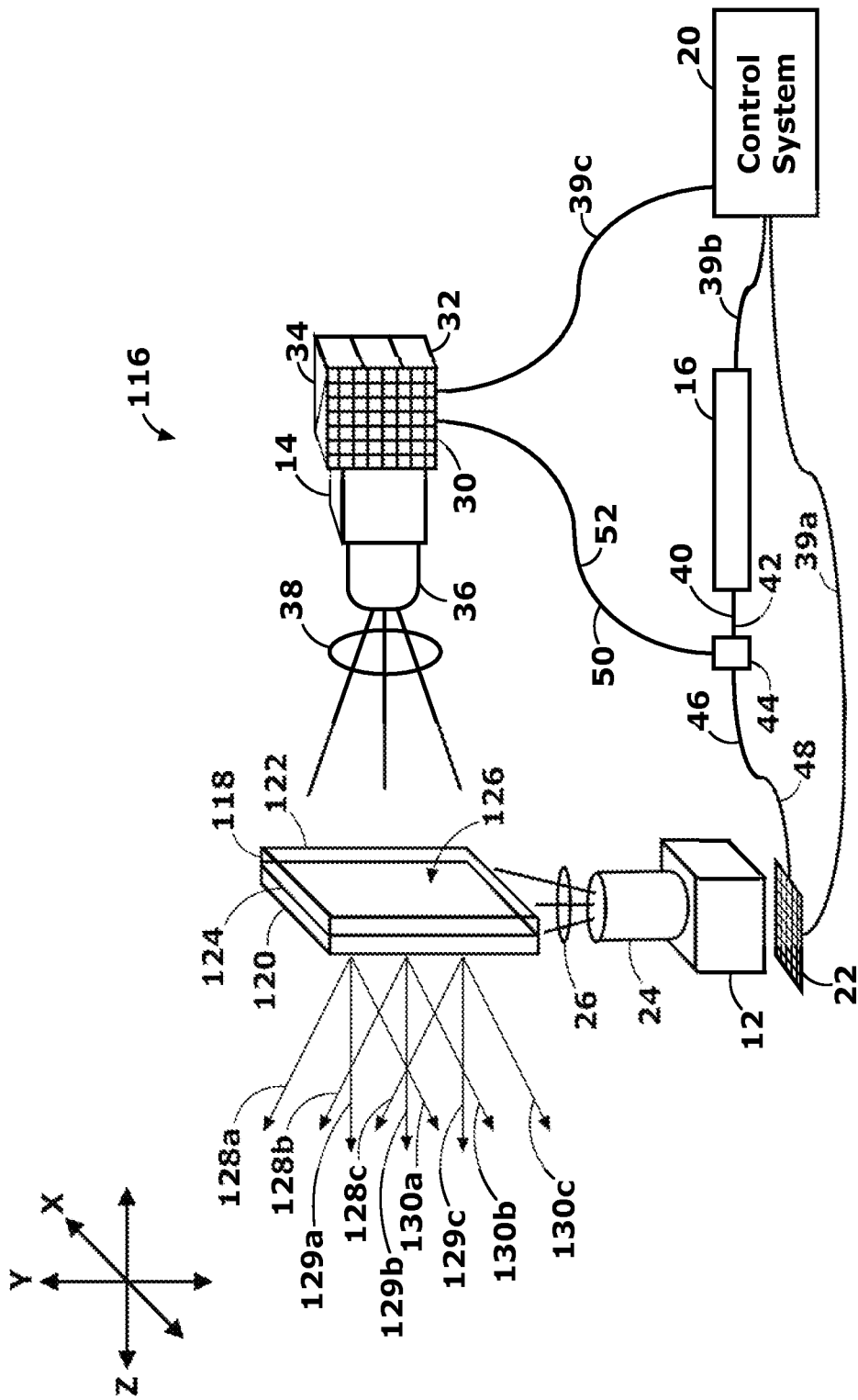
FIG. 6 is a schematic diagram of another embodiment of the three-dimensional display system providing a diffusion screen within a thin-layer image chamber.
Figure 7:
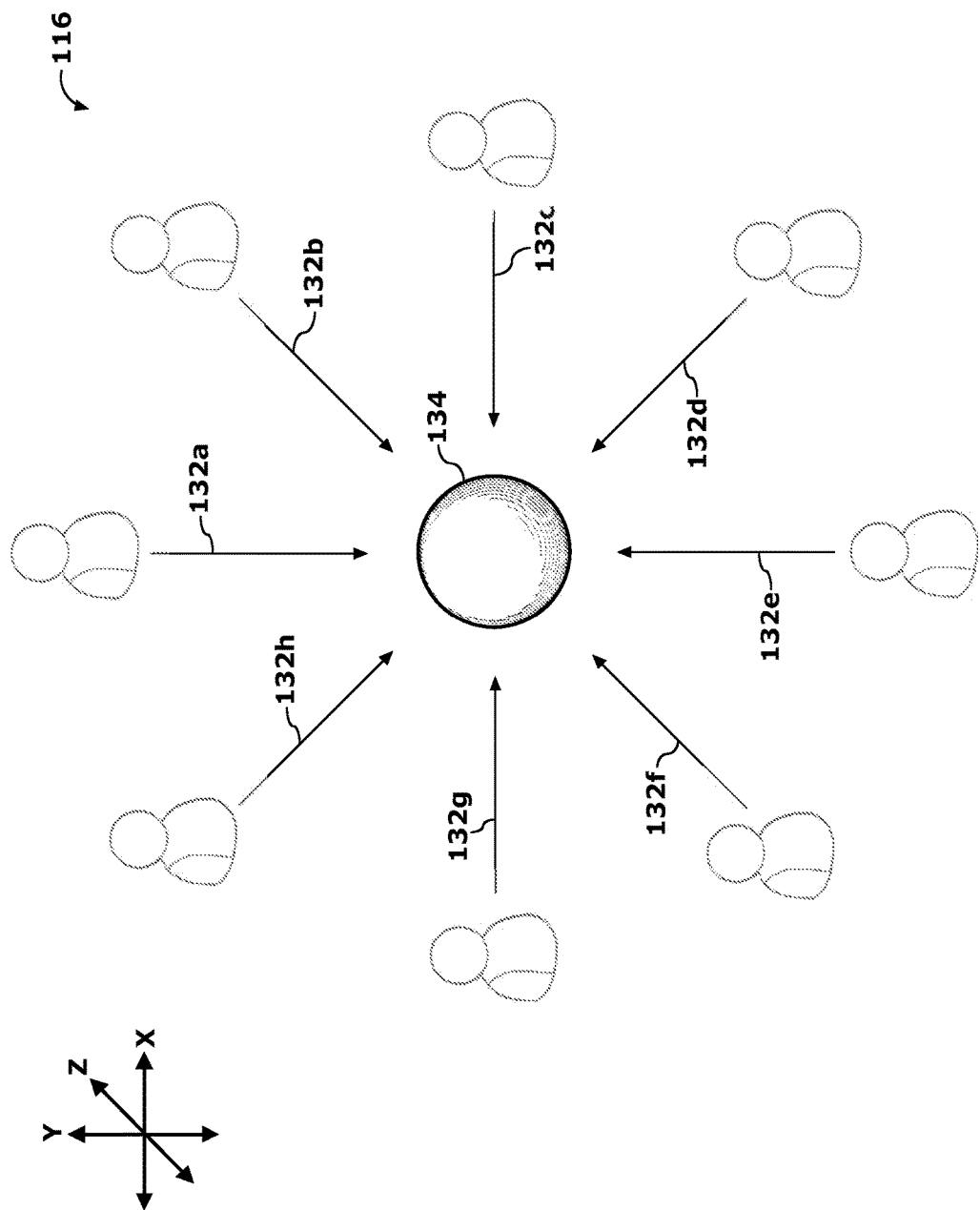
FIG. 7 is a top plan view showing an exemplary manner to generate 2-D images of multiple views of a 3D object in accordance with some embodiments disclosed herein.

Referring now to FIG. 6 and FIG. 7, another embodiment of a three-dimensional display system 116 is shown in a schematic view for generating a 3-D image 134. The three-dimensional display system 116 is constructed in a similar manner as the three-dimensional display system 10, except as described below.

In this embodiment, the three-dimensional display system 116 is provided with an image chamber 118 that is not a volumetric display but instead is a relatively thin layer of appropriately chosen material as described above in which the refractive index at particular locations within the image chamber 118 may be controlled. The three-dimensional display system 116 may be referred to herein as a light field display. In this embodiment, the addressing system 12, the image writing/illumination system 14, the single-frequency laser module 16 and the control system 20 remain the same, however, the method of creating the 3-D image 134 is significantly different.

In this embodiment, the 3-D image 134 may not be divided into slices, but is instead rendered from the standpoint of a plurality of distinct views 132a-132h as shown in FIG. 7. Each distinct view 132a-132h represents how the 3-D image 134 would appear to a viewer observing the 3-D image 134 to be displayed from a specific angle with respect to the x, y or z plane of the image chamber 118. For example, a viewer positioned directly in front of the image chamber 118 and viewing from angle 129, shown in FIG. 6 as a direction perpendicular to the x and y plane of the image chamber 118, would only be presented with one distinct view, 132a for instance, of the 3-D image 134, including any internal aspects of the 3-D image 134 that could be observed, say through a top layer 120 that is intended to be transparent (a glass-topped display box, for example). Another observer viewing from a 45 degree angle 128 or 130 relative to the x and z planes would be presented with another distinct view, 132b or 132h for instance, and a view of the top layer 120 and some sides of the image chamber 118 that would normally be observed by a person positioned at this point with respect to the 3-D image 134.

The program logic 92 in this case converts the distinct views 132a-132h of the original 3-D image 134 into a new format of a set of 2-D image and data views, determined through computations within the program logic 92 and based on the data available on the 3-D image 134 or object to be displayed. The details of each distinct view 132a-132h, such as, for instance, angles 128, 129 and 130 corresponding to distinct views 132b, 132a and 132h respectively, are divided into a grid of squares, with each square again representing one pixel of the 2-D image view to be displayed. Once the 3-D image is converted into a number of 2-D image and data views with a set of pixels determined for each distinct view 132a-132h, the program logic 92 then instructs the control system 20 to begin image generation. The program logic 92 delivers the details of the distinct view 132a to be displayed to the control system 20 which sends synchronized signals to the addressing system 12 and to the image writing/illumination system 14 configured to cause the addressing system 12 to direct the addressing beam 46 into the thin layer of material in the image chamber 118 in the form of a 2-D slice 124, and to cause the image writing system 30 of the image writing/illumination system 14 to direct the data beam 50 to selected pixels in the 2-D slice 124 in the image chamber 118 creating the diffraction screen 126 at the intersection of the addressing beam 46 and the data beam 50 within the image chamber 118.

The program logic 92 causes the control system 20 to send synchronized trigger signals to these systems 12 and 14 to coordinate the operation of the image writing/illumination system 14 and the addressing system 12 so the 2-D slice 124 and the corresponding 2-D data view pixel information are delivered to the image chamber 118 at the same exact time. The single frequency laser module 16 provides optical power to write the diffraction screen 126 details into the image chamber 118. The optical power from the single-frequency laser module 16 is split into the addressing beam 46 and the data beam 50, and the optical power of the addressing beam 46 is delivered to the addressing system 12 and the optical power of the data beam 50 is delivered to the image writing/illumination system 14.

The addressing system 12 directs the optical power from the addressing beam 46 of the single-frequency laser module 16 into the first directed optical energy 26 directed into the image chamber 118, which, in this case illuminates the 2-D slice 124 which has a same area within the image chamber 118. The image writing/illumination system 14, operating in write mode, delivers the optical power of the data beam 50 to selected voxels within the image chamber 118 corresponding to the 2-D data view of the distinct view 132a. Each square area corresponds to one of the pixels in that 2-D data view of the distinct view 132a of the 3-D image 134. The image writing system 30 controls which voxels receive optical power from the data beam 50 and which voxels do not, and the image writing system 30 controls the shape of the writing beams. When a voxel within the image chamber 118 receives optical power from the addressing system 12 and the image writing system 30 simultaneously, the refractive index of the voxel within the image chamber 118 is changed as the two beams interfere.

This change in refractive index creates a diffractive element, or activated voxel, capable of directly scattering any light entering the voxel into a specified direction (angle) corresponding to the viewing angle of the observer. The activated voxels in the 2-D slice 124 comprise the diffraction screen 126. Once all of the diffractive elements have been written, the power from the single-frequency laser module 16 is diverted away from the image chamber 118, and visible light from the illumination system 32, which may be a digital projector or similar source, is directed to the image chamber 118. The illumination system 32 determines the color and brightness of each activated voxel within the diffraction screen 126. Light of the appropriate color and brightness is directed from each pixel of the visible light source to the corresponding diffractive element-containing voxel which makes up the diffraction screen 126 within the image chamber 118.

The diffractive element(s) within the voxel direct this visible light into the desired viewing angle or distribute this visible light into the desired viewing angle range so that an observer positioned at that angle can view the voxel. The image constructed outside of the image chamber 118 is viewed as the combination of all of the light distributed or directed from all of the activated voxels that make up the diffraction screen 126 within the image chamber 118. After displaying the image, the control system 20 causes the illumination system 32 to divert the visible light and causes one of the addressing beam 46 or the data beam 50 split from the beam 40 of the single-frequency laser module 16 to flood the image chamber 118 with directed optical energy 26 or 38 from either the scanning optical system 22 or the image writing system 30. By flooding the image chamber 118 with this directed optical energy 26 or 38, the spatial variation of the refractive index and hence the diffraction screen 126 are erased from the image chamber 118. This prevents these voxels from contributing ghost images to the output from other distinct views 132a-132h of the 3-D image 134 later in the writing and illumination process.

The control system 20 then directs the addressing system 12 to alter the angle at which it directs the first directed optical energy 26 to the image chamber 118, and directs the image writing/illumination system 14 to deliver the second directed optical energy 38 to the appropriate voxels within the 2-D pattern to create the diffraction screen 126 of the next distinct view, 132b for instance. Once the diffraction screen 126 of distinct view 132b has been created, the control system 20 directs the addressing system 12 and the image writing/illumination system 14 to direct the first and second directed optical energy 26 and 38 away from the diffraction screen 126 and directs the image writing/illumination system 14 to subsequently deliver visible light to the diffraction screen 126 to display the 2-D image view of the distinct view 132b of the 3-D image 134 corresponding to a different angle or range of angles occupied by a different viewer. The control system 20 coordinates and directs the addressing system 12, the image writing/illumination system 14 and the single-frequency laser module 16 to step appropriately through all of the distinct views 132a-132h of the 3-D image 134 produced by the program logic 92. If the systems 12, 14 and 16 step through the views quickly enough, all possible viewers effectively see their respective views 132a-132h of the 3-D image 134 simultaneously and therefore will see a 3-D image 134 outside of the image chamber 118. For continual viewing the entire image generation process described is repeated at a high enough rate that the human viewer does not perceive any variations in the intensity of the 3-D image 134 (called flicker). Although only 8 views 132a-132h are shown in FIG. 7, it should be understood that more or less views could be provided depending upon a desired field of view and a maximum scanning rate and/or capabilities of the components used to make the three-dimensional display system 116.

To display a moving 3-D image 11 or 134, the original moving scene is divided into a series of still images, as is standard in all movies, and the series of still images are displayed sequentially in the image chamber 18 or 118. Each of the individual still images is generated in the same manner as the 2-D image slices of the 3-D image 11 or views 132a-132h of the 3-D image 134.

The foregoing description provides illustration and description, but is not intended to be exhaustive or to limit the inventive concepts to the precise form disclosed. Modifications and variations are possible in light of the above teachings or may be acquired from practice of the methodologies set forth in the present disclosure.

Also, certain portions of the implementations may have been described as "components" or "circuitry" that perform one or more functions. The term "component" or "circuitry" may include hardware, such as a processor, an application specific integrated circuit (ASIC), or a field programmable gate array (FPGA), or a combination of hardware and software.

Further, while implementations have been described in the context of an optical network, this need not be the case. These implementations may apply to other types of networks having nonlinear distortions.

Even though particular combinations of features are recited in the claims and/or disclosed in the specification, these combinations are not intended to limit the disclosure. In fact, many of these features may be combined in ways not specifically recited in the claims and/or disclosed in the specification. Although each dependent claim listed below may directly depend on only one other claim, the disclosure includes each dependent claim in combination with every other claim in the claim set.

The following are some exemplary embodiments of the presently disclosed and claimed inventive concepts.

In one embodiment, the presently disclosed inventive concepts is directed to the three-dimensional display system 10. In this embodiment, the three-dimensional display system 10 includes the image chamber 18, the single frequency laser module 16, the beam splitter 44, the addressing system 12, the image writing system 30, the illumination system 32, and the control system 20. The image chamber 18 is constructed of a material having photo-refractive properties. The single frequency laser module 16 is configured to produce a beam. The beam splitter 44 is configured to receive the beam and split the beam into an addressing beam and a data beam. The addressing system 12 is configured to receive the addressing beam and project a sequence of first directed optical energy into the image chamber 18 based on the addressing beam and at predetermined locations within the image chamber 18. The image writing system 30 is configured to receive the data beam and project a sequence of second directed optical energy into the image chamber 18 to intersect the first directed optical energy at selected points to form a series of diffusion screens 62 within the image chamber 18. The at least one illumination system 32 is configured to selectively project visible light in at least a portion of a sequence of 2D cross-sectional images of a three-dimensional image onto the diffusion screens 62 to create the three-dimensional images. The control system 20 synchronizes and controls the addressing system 12, the image writing system 30, and the at least one illumination system 32 to create the series of diffusion screens 62, project visible light onto particular ones of the diffusions screens 62 and to erase a first diffusion screen of the series of diffusion screens prior to creating a second diffusion screen of the series of diffusion screens 62.

In some embodiments, the presently disclosed and claimed inventive concepts describe a method. In the method, a diffusion screen 62 is formed at a predetermined location$_1$ of a set of predetermined locations 1-$n$ within the image chamber 18. The diffusion screen 62 is illuminated with visible light indicative of a cross-sectional image$_1$ of a set of a plurality of cross-sectional images 1-N of a three-dimensional image 11 at the predetermined location$_1$ within the image chamber. The diffusion screen 62 is erased and the method is repeated for cross-sectional images 2-N and predetermined locations 2-$n$ of the three-dimensional image 11 at a scan rate sufficient to produce a representation of the three-dimensional image 11 in the image chamber 18.

In some embodiments, the presently disclosed and claimed inventive concepts describe another method. In this method, a diffraction screen 126 is formed within the image chamber 118, the diffraction screen 126 being configured to refract light from a source location to a viewing location$_1$ selected from a group of predetermined viewing locations 1-$v$. The diffraction screen 126 is illuminated with visible light indicative of a 2D image$_1$ of a three-dimensional image 134 from a standpoint of the viewing location$_1$, the view$_1$ being selected from a group of views 1-V. The diffraction screen 126 is erased and these steps are repeated for views 2-V and predetermined viewing locations 2-$v$ to produce a representation of the three-dimensional image. In one embodiment, v=V (e.g., 100, 1000 or the like) and the magnitude of v or V depends upon the number of desired viewing angles for observing the three-dimensional image 134.

No element, act, or instruction used in the present application should be construed as critical or essential to the invention unless explicitly described as such outside of the preferred embodiment.

REFERENCE

[1] Hans J. Coufal, Demetri Psalties, Glenn T. Sincerbox, A. M. Glass, and M. J. Cardillo, Holographic data storage, Springer Series in Optical Sciences, Aug. 30, 2012.

What is claimed is:

1. A three-dimensional display system comprising:
an image chamber constructed of a material having photo-refractive properties;
a single frequency laser module configured to produce a beam,
a beam splitter configured to receive the beam and split the beam into an addressing beam and a data beam,
an addressing system configured to receive the addressing beam and project a sequence of first directed optical energy into the image chamber based on the addressing beam and at predetermined locations within the image chamber,
an image writing system configured to receive the data beam and project a sequence of second directed optical energy into the image chamber to intersect the first directed optical energy at selected points to form a series of diffusion screens within the image chamber;
at least one illumination system configured to selectively project visible light in at least a portion of a sequence of 2D cross-sectional images of a three-dimensional image onto the diffusion screens to create the three-dimensional image; and
a control system synchronizing and controlling the addressing system, the image writing system, and the at least one illumination system to create the series of diffusion screens, project visible light onto particular ones of the diffusions screens and to erase a first diffusion screen of the series of diffusion screens prior to creating a second diffusion screen of the series of diffusion screens.

2. The three-dimensional display system of claim 1, wherein the image chamber comprises:
a photoaddressable polymer having a first molecular configuration and a second molecular configuration,
wherein the photoaddressable polymer is configured to change from the first molecular configuration to the second molecular configuration when exposed simultaneously to the first and second directed optical energy; and
the photoaddressable polymer further being configured to change from the second molecular configuration to the first molecular configuration when exposed to either one of the first directed optical energy and the second directed optical energy.

3. The three-dimensional display system of claim 1, wherein the image chamber comprises:
a nanoparticle-based material having at least one first refractive index and at least one second refractive index,
wherein the nanoparticle-based material is configured to change from the first refractive index to the second refractive index when exposed simultaneously to the first and second directed optical energy; and
the nanoparticle-based material further being configured to change from the second refractive index to the first refractive index when exposed to either one of the first directed optical energy and the second directed optical energy.

4. The three-dimensional display system of claim 1, wherein the first directed optical energy and the second directed optical energy are coherent.

5. The three-dimensional display system of claim 1, wherein the addressing system is configured to project the sequence of first directed optical energy into the image chamber at a first direction, and the image writing system is configured to project the sequence of second directed optical energy into the image chamber at a second direction and wherein the first direction is different from the second direction.

6. The three-dimensional display system of claim 5, wherein the first direction is within a range of 85 to 95 degrees from the second direction.

7. The three-dimensional display system of claim 1, wherein each of the predetermined locations within the sequence of first directed optical energy is at a different location within image chamber.

8. The three-dimensional display system of claim 1, wherein the predetermined locations within the sequence of first directed optical energy includes a first location and a second location and wherein the first location and the second location are spaced apart.

9. The three-dimensional display system of claim 8, wherein the first location is a first plane within the image chamber, and the second location is a second plane within the image chamber, and wherein the first plane is parallel to the second plane.

10. The three-dimensional display system of claim 1, wherein the first and second diffusion screens within the series of diffusion screens are configured to refract visible light in at least one of all horizontal, tilted and vertical directions, and a limited angle of view based upon a desired field of view of the three-dimensional image.

11. The three-dimensional display system of claim 1, wherein the first and second diffusions screens within the series of diffusion screens are substantially identical and formed at different locations within the image chamber.

12. The three-dimensional display system of claim 1, wherein the first and second diffusion screens within the series of diffusion screens are formed with information independent of the sequence of 2D cross-sectional images.

13. The three-dimensional display system of claim 1, wherein the at least one illumination system is located outside of the image chamber.

14. The three-dimensional display system of claim 1, wherein the three-dimensional image has confines, and wherein the at least one illumination system is located outside of the confines of the three-dimensional image.

15. The three-dimensional display system of claim 1, wherein the material is a non-upconversion material.

* * * * *